Figure 1:
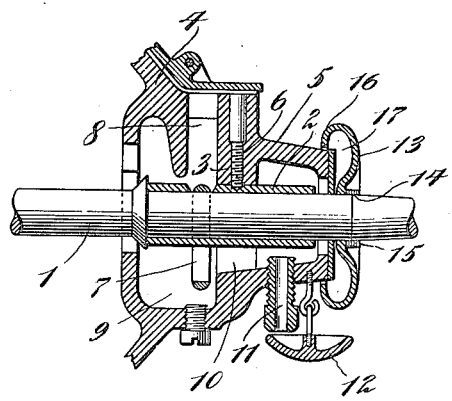

C. H. J. DILG.
SHIELD FOR BEARINGS.
APPLICATION FILED APR. 26, 1915. RENEWED MAY 2, 1918.

1,269,405.

Patented June 11, 1918.

Witness
Geo. C. Cheney

Inventor
Charles H. J. Dilg
By his Attorneys
Rosenbaum, Stockbridge & Borst

UNITED STATES PATENT OFFICE.

CHARLES H. J. DILG, OF RYE, NEW YORK.

SHIELD FOR BEARINGS.

1,269,405.  Specification of Letters Patent.  Patented June 11, 1918.

Original application filed April 30, 1910, Serial No. 558,588. Divided and this application filed April 26, 1915, Serial No. 24,011. Renewed May 2, 1918. Serial No. 232,157.

*To all whom it may concern:*

Be it known that I, CHARLES H. J. DILG, a citizen of the United States, residing at Rye, in the county of Westchester and State of New York, have invented certain new and useful Improvements in Shields for Bearings, of which the following is a full, clear, and exact description.

This invention relates to a shield or guard adapted for use with shafts having their ends adjacent to, or projecting beyond the ends of their bearings, such construction being common, as in electric motors, where the projecting part of the rotatable shaft carries a tool or fan, as is shown in my application Serial No. 558,588, filed April 30, 1910, of which case the present one is a division.

One of the objects of the invention is to provide a "dust guard" for protecting the contacting surfaces of the bearing and shaft from dust or dirt, which travels along the shaft and enters the bearing to increase the friction and wear between these parts. In accordance with this object the invention contemplates a disk which is mounted on the shaft in close proximity to the end of the bearing, which disk serves as a deflector to divert by centrifugal force, the dust which travels along the shaft, when it is rotating, away from the contacting surfaces of the bearing and shaft. The disk, when in rapid rotation, also acts like a fan and the current of air which it sets up prevents any dust and dirt from settling upon the end of the bearing or adjacent points of the shaft.

Another object of the invention is to provide a shield or guard which will prevent the oil which leaks out upon the end or the projecting portion of the shaft from being spattered on adjacent objects, and this is obtained by providing an annular chamber in the aforementioned disk which serves as an oil cup and catches the oil as it is thrown from the shaft by centrifugal force.

The invention is equally applicable to a construction in which the shaft is held stationary and supports a member which may be regarded as the equivalent of the bearing, and which is adapted to rotate, in which instance the disk is mounted upon the rotatable member and has the same functions, serving as either a dust guard alone or as a combined dust and oil guard, when an annular chamber is provided in it.

In the accompanying drawings, the invention is illustrated in connection with the bearing forming a part of the motor casing of the electric motor shown in my parent application referred to, but this type of bearing is shown for illustrative purposes only and the invention is equally applicable to all forms of bearings in which the shaft ends with or projects beyond the end thereof.

Figure 2:
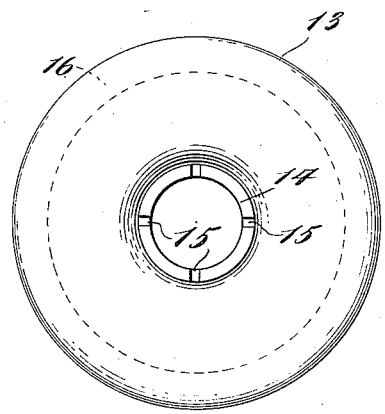

Figure 1 of the drawing shows a central section through such a bearing and mounted upon the shaft is a combined oil and dust guard forming the basis of this invention; and Fig. 2 is a plan on an enlarged scale of the guard removed from the shaft.

The shaft 1 which may be a continuation of an armature shaft, or driven in any other suitable manner, extends from the end of the bearing consisting of a sleeve or box 2 surrounding the shaft, which sleeve is supported by and fitted into an opening in a rib 3 carried by the bearing casing 4. This casing or shell is formed integral with the motor casing, not shown, and is provided with a substantially cylindrical extension or hub 5, whose end surface is provided with a suitable opening through which the shaft 1 projects. The sleeve 2 is maintained against rotation by a set screw 6 which is threaded into a suitable opening in the rib 3.

The sleeve 2 is provided with a recess or slot in its upper surface, in which an oil ring 7 rests, so that it bears directly upon the shaft and oil is fed into the bearing through an opening or passageway 8. In the bottom of the bearing casing a reservoir 9 for the oil is provided, which leads through a slot or recess 10 in the rib 3 to an overflow pipe 11, which prevents the bearing from being flooded with the lubricant. The oil from the overflow pipe is caught by a drip pan 12 depending from the lower portion of the hub 5, the construction described being similar to the bearing disclosed in the parent application aforesaid, and the particular construction of which is not essential to the present invention.

Referring now to the novel features of the invention,—mounted upon the shaft in close proximity to the end of the hub is a disk 13 which is preferably made of sheet metal and is attached to the shaft, being fastened to the end of the shaft if the shaft does not project, or being slipped on to the shaft if the shaft projects. In the latter case, which is the illustrated construction, the disk is provided with a hub 14, which has an opening therein of a diameter sufficient to receive the shaft 1, the hub 14 being secured to the shaft in any suitable way, or the frictional engagement with the shaft may be sufficient to hold it in place. In that event the hub may be slotted as at 15, or otherwise formed so as to give it the necessary resiliency. The outer edge 16 of the disk is turned over or curved to provide an annular chamber 17 which surrounds the end of the extension or hub 5 of the bearing, the outer edge of the disk being curved into close proximity to this hub so that the disk virtually forms a cap around the end of the bearing.

When the shaft is rotating rapidly, the particles of dust or dirt in the surrounding atmosphere are attracted to the shaft and tend to travel along the same and enter the space between the shaft and the bearing. The disk described prevents this dust from entering the bearing, since it is closely fitted around the shaft and will therefore act as a deflector, the particles of dust when reaching the disk being thrown off from the shaft by centrifugal force before they can enter the bearing. The fan action of the disk when the shaft is rotating, will also create a current of air which will prevent any of the particles of dust or dirt from settling on the end of the bearing, or upon the shaft adjacent to this point, the particles of dust being carried away from the bearing by the current of air which is produced. Moreover, any oil which leaks out of the bearing onto the projecting portion of the shaft will be thrown by centrifugal force into the annular chamber where it will be retained by centrifugal force until the shaft has stopped rotating and if the annular chamber is filled with oil at this time the oil will gather in the lower portion of the annular chamber and overflow into the drip-pan. This annular chamber also serves as a drip-cup and catches the oil dropping from the end face of the bearing if the hub of the bearing is fitted into the annular chamber, although this is not important, since the drip-pan 12 would catch this oil if the disk were not used.

It will therefore be seen that the disk described has two functions, serving both as a dust guard and an oil shield, but it is to be noted that if the annular chamber is omitted the disk then serves as a dust guard alone and it is intended that this feature of construction will be covered as well as one in which the disk has its combined function.

While the disk has been shown in connection with a bearing supporting a projecting rotatable shaft, yet it is apparent that if the shaft were stationary and supported a member similar to a bearing such as the hub of a pulley, the disk constituting the dust and oil guard could be fastened to the rotating hub, and still closely surround the shaft and obtain similar results as when it is used upon a rotating shaft, and it is intended that the term "bearing" will cover a construction in which the member which surrounds the shaft is the rotating part.

I claim:

The combination with a bearing and shaft of a shield carried by the rotating part and comprising a disk having a peripheral oil-retaining chamber, said disk being mounted to receive oil escaping from the bearing surfaces and to convey the same to the peripheral chamber.

In witness whereof, I subscribe my signature, in the presence of two witnesses.

CHARLES H. J. DILG.

Witnesses:
 VICTOR D. BORST,
 WALDO M. CHAPIN.